United States Patent
Ahmet (10) Patent No.: US 11,019,617 B1
(45) Date of Patent: May 25, 2021

(54) NARROW BAND INTERNET OF THINGS DEPLOYMENT MODES

(71) Applicant: T-Mobile USA, Inc., Bellevue, WA (US)

(72) Inventor: Jeff Ahmet, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/879,548

(22) Filed: May 20, 2020

(51) Int. Cl.
*H04W 72/04* (2009.01)
*H04W 28/26* (2009.01)
*G16Y 10/75* (2020.01)

(52) U.S. Cl.
CPC ......... *H04W 72/044* (2013.01); *H04W 28/26* (2013.01); *G16Y 10/75* (2020.01)

(58) Field of Classification Search
CPC ..... H04W 72/044; H04W 28/26; G16Y 10/75
See application file for complete search history.

(56) References Cited

U.S. PATENT DOCUMENTS

| | | | |
|---|---|---|---|
| 2015/0011233 A1* | 1/2015 | Kazmi | H04W 72/044 455/454 |
| 2018/0098293 A1* | 4/2018 | Jiang | H04L 27/2692 |
| 2018/0206271 A1* | 7/2018 | Chatterjee | H04L 5/0053 |
| 2019/0182764 A1* | 6/2019 | Nader | H04W 48/12 |
| 2019/0268198 A1* | 8/2019 | Oketani | H04W 72/04 |
| 2019/0349881 A1* | 11/2019 | Choi | H04W 64/00 |
| 2020/0136792 A1* | 4/2020 | Axmon | H04L 67/12 |
| 2020/0187256 A1* | 6/2020 | Lim | H04W 72/042 |
| 2020/0187263 A1* | 6/2020 | Shreevastav | H04W 74/0833 |
| 2020/0280866 A1* | 9/2020 | Nader | H04W 8/18 |
| 2020/0345969 A1* | 11/2020 | Choi | A61M 21/02 |
| 2020/0351885 A1* | 11/2020 | Jamadagni | H04W 28/00 |
| 2020/0374852 A1* | 11/2020 | Khoshnevisan | H04L 5/0091 |
| 2020/0383144 A1* | 12/2020 | Sun | H04W 72/0453 |
| 2020/0396045 A1* | 12/2020 | Wang | H04W 4/80 |

OTHER PUBLICATIONS

Futurewei, "WID Revision: Additional Enhancements for NB-IoT", 3GPP Work Item Description, 3GPP TSG RAN meeting, Jun. 2019, 4 pgs.

* cited by examiner

*Primary Examiner* — Ernest G Tacsik
(74) *Attorney, Agent, or Firm* — Lee & Hayes, P.C.

(57) ABSTRACT

Techniques for deploying Narrow Band Internet of Things (NB IoT) devices in wireless network(s) are discussed herein. NB IoT has several deployment modes: standalone, guard band, and in-band. Aspects of this disclosure are directed to deploying NB IoT devices in a Fourth Generation (4G) communication system to operate in a guard band mode and subsequently maintaining the deployment of those NB IoT devices in a Fifth Generation (5G) communication system to operate in an in-band mode.

20 Claims, 5 Drawing Sheets

```
┌─────────────────────────────────────────────────┐
│ RECEIVE, FROM AN ENODEB, A CONNECTION REQUEST FROM A │
│ NARROW BAND (NB) INTERNET OF THINGS (IOT) DEVICE, THE │
│ CONNECTION REQUEST RECEIVED AS AN LTE GUARD BAND │
│ COMMUNICATION ASSOCIATED WITH A FREQUENCY RESOURCE │
│                      502                         │
└─────────────────────────────────────────────────┘
                        │
                        ▼
┌─────────────────────────────────────────────────┐
│ RECEIVE, FROM THE ENODEB, FIRST DATA FROM THE NB IOT DEVICE │
│                 AT A FIRST TIME                  │
│                      504                         │
└─────────────────────────────────────────────────┘
                        │
                        ▼
┌─────────────────────────────────────────────────┐
│ RECEIVE, FROM A GNODEB, SECOND DATA FROM THE NB IOT DEVICE │
│ AT A SECOND TIME AFTER THE FIRST TIME, THE SECOND DATA │
│ RECEIVED AS A 5G IN-BAND COMMUNICATION ASSOCIATED WITH THE │
│                 FREQUENCY RESOURCE               │
│                      506                         │
└─────────────────────────────────────────────────┘
```

FIG. 5

NARROW BAND INTERNET OF THINGS DEPLOYMENT MODES

BACKGROUND

Wireless communication devices use radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

In some cases, Narrow Band Internet of Things (NB IoT) devices communicate wirelessly with a 4G communication system or a 5G communication system. Often, such NB IoT devices may use limited bandwidth or may transmit at irregular or infrequent intervals. Increasing numbers of deployed NB IoT devices may increase communication demands on wireless networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure is directed to deploying Narrow Band Internet of Things (NB IoT) devices in wireless network(s). NB IoT has several deployment modes: standalone, guard band, and in-band. In particular, aspects of this disclosure are directed to deploying NB IoT devices in a Fourth Generation (4G) communication system to operate in a guard band mode and subsequently maintaining the deployment of those NB IoT devices in a Fifth Generation (5G) communication system to operate in an in-band mode.

In some examples, these techniques simplify the deployment of NB IoT devices and minimize disruptions to NB IoT devices while transitioning from 4G communication systems to 5G communication systems. For example, a NB IoT device can be configured to transmit and/or receive communications via a portion of a frequency resource associated with a 4G guard band. The NB IoT device can communicate with a 4G base stations (e.g., an eNodeB) to access data networks or other computing devices. The NB IoT device can be deployed in a guard band mode to avoid sharing a portion of spectrum with other 4G carrier signals. An indication of the NB IoT device and/or the frequency resource associated with the NB IoT device can be stored and transmitted to a 5G base station (e.g., a gNodeB) at a later time.

The 5G base station may receive an indication of the NB IoT device and/or the use of the frequency resource by the NB IoT device and may allocate frequency resources to the NB IoT device based on the indication. For example, the gNodeB may carve out, reserve, or otherwise allocate a portion of spectrum such that the NB IoT may use the frequency resources that are in-band with respect to the 5G transmission.

In some examples, the 5G base station can receive and/or otherwise determine scheduling data associated with transmission(s) associated with the NB IoT device. In some examples, the 5G base station can dynamically allocate frequency resources to the NB IoT device based on the scheduling data such that the frequency resources can be allocated to the NB IoT device at a first time and can be allocated to one or more other 5G devices at another time.

In some examples, the techniques may include receiving, by a 4G base station or a 5G base station, a transmission from another NB IoT device not operating in the frequency resources allocated to NB IoT devices. The 4G or 5G base stations can provide an indication to the other NB IoT device to cause the NB IoT device to transmit and/or receive data using the particular frequency resource. Thus, the base stations can redeploy NB IoT devices to either change a frequency resource used by the NB IoT device and/or to change a deployment mode (e.g., standalone, guard band, in-band) associated with the NB IoT device.

Further, in some examples, a 4G and/or a 5G carrier may be adjusted to maintain orthogonality with the NB IoT transmissions in order to reduce any interference between the NB IoT transmissions and the 4G and/or 5G transmissions.

The systems, devices, and techniques described herein can be implemented in a number of ways. In general, the techniques discussed herein may be implemented in any multi-RAT environment, and are not limited to 2G, 3G, 4G, and/or 5G environments. In some examples the techniques can be used in license assisted access (LAA) contexts. In some instances, techniques may be implemented in a core network that can be represented as a 4G core network and/or a 5G core network. Example implementations are provided below with reference to the following figures.

Figure 1:
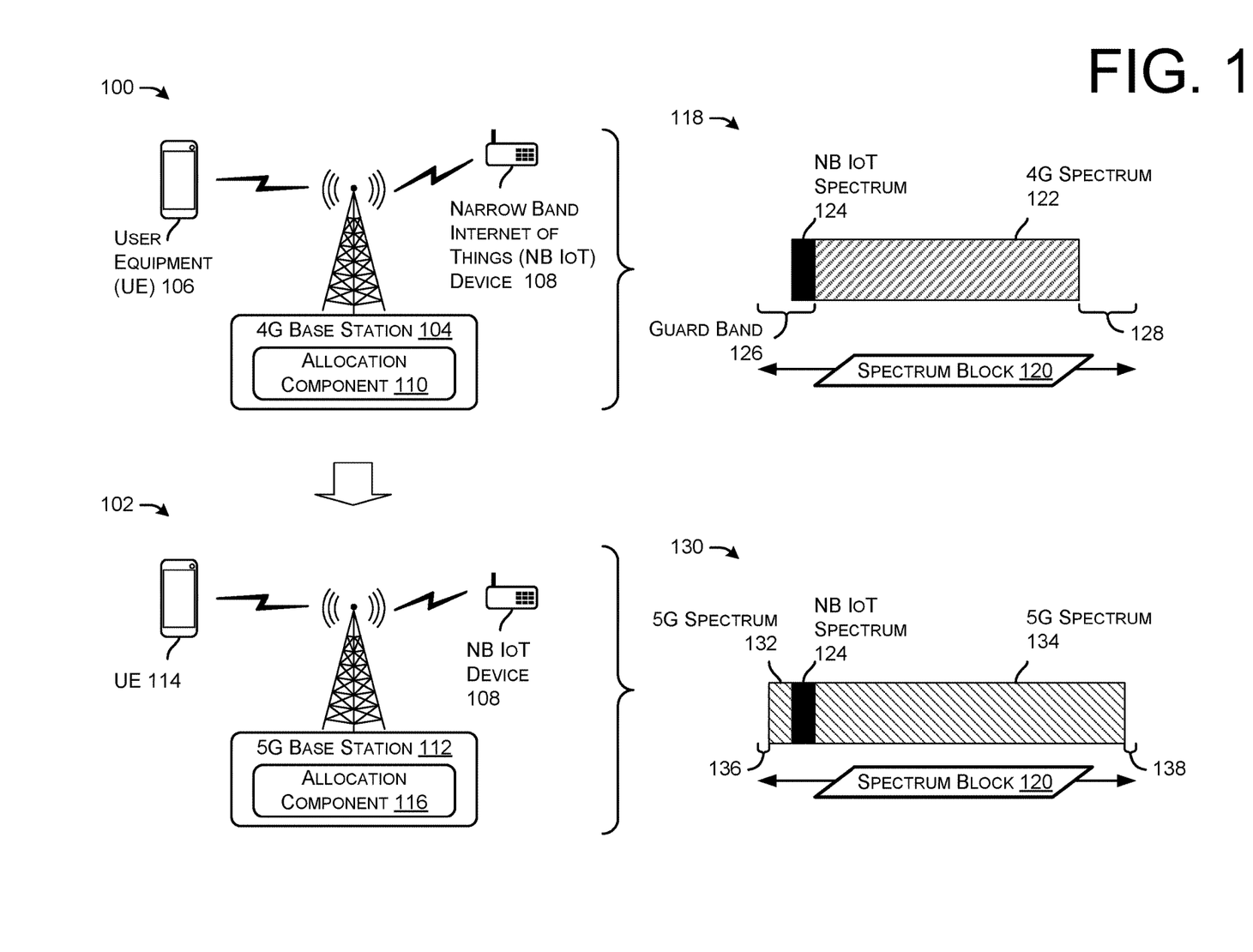
FIG. 1 illustrates an example environment including user equipment, narrow band Internet of Things (NB-IoT) device(s), and various components implementing deployment techniques, as described herein.

FIG. 1 illustrates an example environment including user equipment, narrow band Internet of Things (NB-IoT) device(s), and various components implementing deployment techniques, as described herein.

A first deployment environment is illustrated as an environment 100 while a second deployment environment 102 is illustrated as an environment 102. In some examples, the environment 100 represents a network at a first time and the environment 102 represents the network at a second time after the first time.

The environment 100 includes a 4G base station 104 facilitating communications with a user equipment (UE) 106 and a narrow band Internet of Things (NB IoT) device 108. The 4G base station 104 may comprise an allocation component 110. Although illustrated as being included in the 4G base station 104, in some examples the allocation component 110 may be implemented in another device or as a stand alone computing device in communication with the 4G base station 104.

The environment 102 includes a 5G base station 112 facilitating communications with a UE 114 and the NB IoT device 108. The 5G base station 112 may comprise an allocation component 116. Although illustrated as being included in the 5G base station 112, in some examples the allocation component 116 may be implemented in another device or as a stand alone computing device in communication with the 5G base station 112. Further, in some examples, the allocation component 116 may correspond to the allocation component 110 associated with the environment 100.

In some examples, the UE 106 may be a 4G capable device and the UE 114 may be a 4G/5G capable device. In some examples, both of the UEs 106 and 114 may be capable of communicating using at least 4G and 5G communication protocols.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards. Although often discussed in the context of 4G and 5G environments, the techniques discussed herein may be implemented in any dual connectivity, multi connectivity, or multiple bearer environment.

In some examples, the environment 100 and/or 102 include core network(s). In some examples, a core network may include a 4G core network including a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, a core network can include a 5G core network. For instance, a core network may include any of an Access and Mobility management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

The terms "user equipment (UE)," "user device," "wireless communication device," "wireless device," "communication device," "mobile device," and "client device," can be used interchangeably to describe any UE (e.g., the UE 106 the UE 114) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 106 and/or the UE 114) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network.

Examples of the NB IoT device 108 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In some examples, the NB IoT device 108 may communicate using one or more low power wide area network (LPWAN) protocols. Examples of such LPWAN protocols may include, but are not limited to: Constrained Application Protocol (CoAP); Message Queuing Telemetry Transport (MQTT); lightweight machine-to-machine (LWM2M) standard; a standard compliant with a SEMTECH transceiver; a LoRaWAN® standard; a ZigBee standard; a Bluetooth or Bluetooth Low Energy standard; a haystack standard; an LTE Advanced for Machine Type Communications standard; a MySensors standard; a NarrowBand Internet-of-things (IoT) standard; a NB-Fi standard; an NWave standard; a Random Phase Multiple Access (RPMA) standard; a Senet standard; a Sigfox standard; a Symphony Link standard; a ThingPark Wireless standard; an Ultra Narrow Band (UNB) standard; and a Weightless standard.

Any of the UEs 106 and 114 and/or the NB IoT device 108 may be capable of supporting 4G radio communications, such as LTE radio communications, and/or 5G radio communications, such as New Radio (NR) communications. In some examples, either or both of UEs 112 and 114 and/or the NB IoT device 108 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

An example 118 illustrates a spectrum block 120 used by the 4G base station 104 to communicate with the UE 106 and/or the NB IoT device 108. For example, the 4G base station 104 may use a portion of the spectrum illustrated as a 4G spectrum 122 to communicate with one or more UEs, including the UE 106. The NB IoT device 108 may be deployed in a guard band mode such that the NB IoT device 108 uses a portion (e.g., illustrated as NB IoT spectrum 124) of a guard band 126 of the spectrum block 120 to communicate with the 4G base station 104. The NB IoT spectrum 124 is implemented the guard band 126 associated with the spectrum block 120. Although illustrated as being implemented in the guard band 126, the NB IoT spectrum 124 may be implemented in another guard band 128 associated with the spectrum block 120.

In some examples, the allocation component 110 can allocate portions of the spectrum block 120 to the 4G spectrum 122, the guard bands 126 and 128, and/or the NB IoT spectrum 124.

As noted above, because the NB IoT spectrum 124 is implemented in the guard band 126 associated with the 4G spectrum 122, the NB IoT spectrum 124 can be implemented without reserving frequency resources for 4G carrier signals. Additional details and implementations are provided below in FIGS. 2 and 3.

An example 130 illustrates the spectrum block 120 at a second time after the first time (e.g., the first time illustrated in the example 118). In this example 130, the spectrum block 120 comprises 5G spectrums 132 and 134 associated with guard bands 136 and 138. In some examples the 5G spectrum 132 and 134 may otherwise correspond to portions of the spectrum block 120 allocated to 5G carrier signals.

The example 130 further illustrates the spectrum block comprising the NB IoT spectrum 124. However, in this example 130, the NB IoT spectrum 124 is implemented in-band with respect to the 5G spectrum 132 and 134 rather than as in guard band mode with respect to the 4G spectrum 122.

Further, as the 5G protocol may be more efficient generally with respect to using the spectrum block 120 relative to the 4G protocol, the sizes of guard bands 136 and 138 may be smaller than the corresponding guard bands 126 and 128. However, in some examples, the guard bands 136 and/or 138 may be the same size or larger than the corresponding guard band 126 and/or 128.

In some examples, the allocation component 116 can identify or otherwise determine the presence of the NB IoT device 108 communicating with the 5G base station 112 and can allocate, set, reserve, or otherwise determine the portions of the spectrum block 120 allocated to the guard bands 136 and 138, the 5G spectrums 132 and 136, and the NB IoT spectrum 124. Accordingly, the NB IoT device 108 may communicate with the 4G base station 104 and the 5G base station 112 using the same NB IoT spectrum 124, thereby simplifying deployment of NB IoT devices and simplifying a transition of networks from supporting 4G devices to supporting 5G devices. Additional details and examples of deployment implementations are discussed throughout this disclosure.

Figure 2:
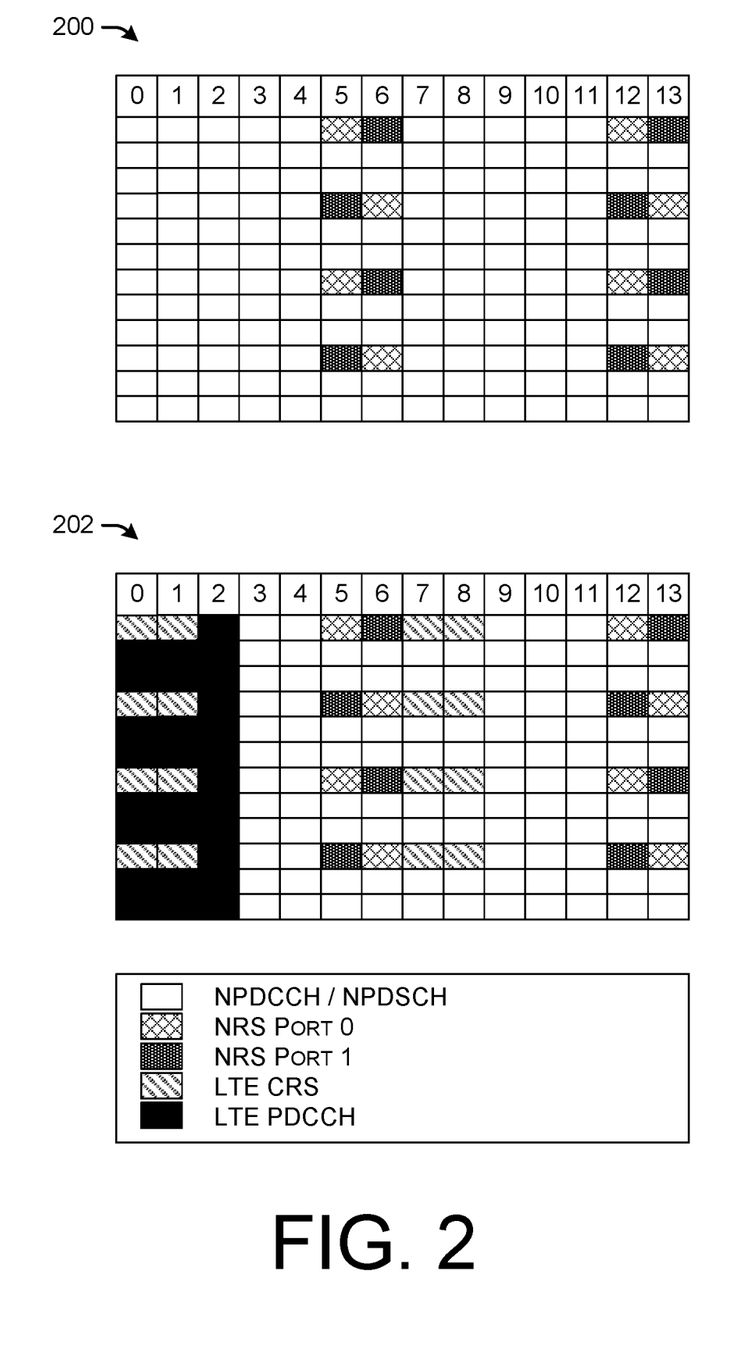
FIG. 2 illustrates example implementations of stand alone, guard band, and in-band deployments, as described herein.

FIG. 2 illustrates example implementations of stand alone, guard band, and in-band deployments, as described herein. For example, FIG. 2 illustrates deployments of an NB IoT device in a 4G environment (e.g., the environment 100) and/or an NB IoT device in a 5G environment (e.g., the environment 102).

A first example 200 illustrates a physical resource block (PRB) associated with stand alone or guard band transmissions. The first example 200 may also illustrate the PRB associated with the "in-band" transmissions with respect to 5G in the environment 102. A second example 202 illustrates a PRB associated with an in-band transmission with respect to 4G in the environment 102.

A PRB illustrates transmission time interval (TTI) slots 0-13. A horizontal aspect of the PRB represents time, while a vertical aspect of the PRB represents a frequency range. Individual resource elements of the PRB represent at least NPDCCH (Narrowband Physical Downlink Control Channel)/NPDSCH (Narrowband Physical Downlink Shared Channel), NRS (Narrowband Reference signal) Port 0, NRS (Narrowband Reference signal) Port 1, LTE CRS (cell specific reference signal), and LTE PDCCH (physical downlink control channel).

The first example 202 includes NPDCCH/NPDSCH, NRS Port 0, and NRS Port 1.

As illustrated, the second example 202 further includes LTE CRS and LTE PDCCH symbols which represent 4G control overheads. The presence of these signals reduces an availability of data for NB IoT devices. Accordingly, in the first example 200, PRBs associated with standalone or guard band transmissions may not require 4G control overheads.

Of note, the NB IoT deployed in guard band or in-band mode in the 4G context may, in the context of the disclosure, be deployed as an "in-band" NB IoT device in the 5G context. However, by allocating frequency resources (e.g., as illustrated in the environment 102) the frequency resources provided to the NB IoT device can be implemented similar to the first example 200 rather than as the "in-band" mode in the 4G context illustrated in the second example 202.

Figure 3:
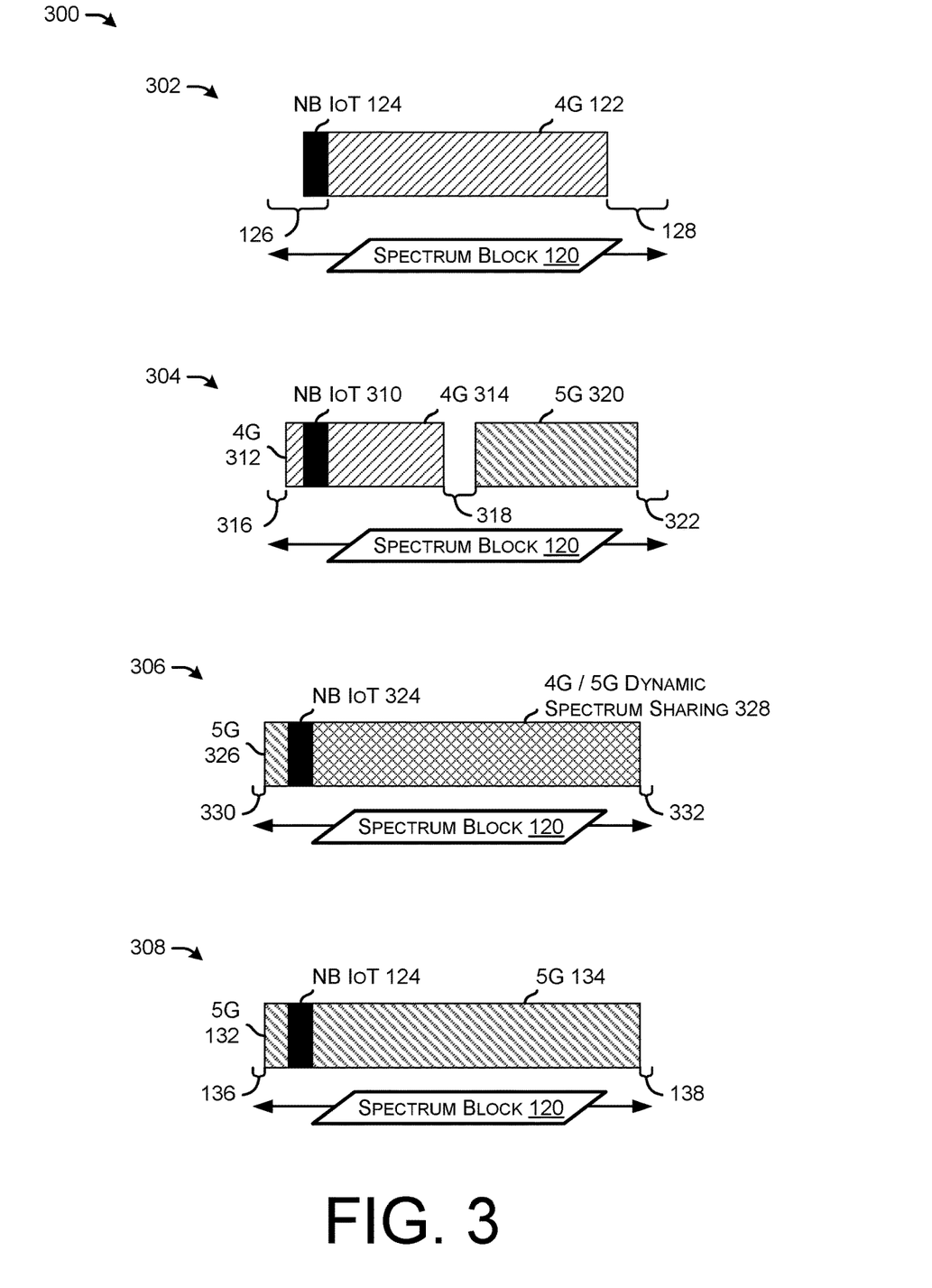
FIG. 3 illustrates example implementations of deployment techniques, as described herein.

FIG. 3 illustrates example implementations 300 of deployment techniques, as described herein.

An example 302 corresponds to the example 118 illustrated in FIG. 1. For example, the example 302 illustrates an environment in which the NB IoT resource is implemented in a guard band mode adjacent to the 4G spectrum 122.

An example 304 illustrates a static allocation of a portion of the spectrum block between NB IoT, 5G, and 4G. For example, a NB IoT portion 310 may be implemented in-band with respect to 4G resources 312 and 314. In some examples, the 4G resources 312 and 314 may be associated with guard bands 316 and 318. Further, a portion of the spectrum block 120 may be allocated to 5G resources 320. The 5G resources 320 may be associated with guard bands 318 and 322.

Note that the width of the portions illustrated herein represent a size of a frequency block allocated to that particular portion or resource. While example implementations are shown, this disclosure is not limited to the relative sizes as illustrated and discussed herein, and additional implementations are contemplated.

Further, in the example 304, while the NB IoT 310 is implemented in-band in the 4G resources 312 and 314, in some examples the NB IoT 310 may be implemented in-band the 5G resource 320. In some examples, the NB IoT 310 may be similar to or the same as the NB IoT 124 discussed herein.

An example 306 illustrates a dynamic allocation of a portion of the spectrum block 120 between NB IoT, 5G, and 4G. For example, a NB IoT portion 324 may be implemented in band with respect to resources 326 and 328. Further, guard bands 330 and 332 may be associated with the resources 326 and 328.

In some examples, the NB IoT 324 can be implemented in-band in the 5G resource 326, while sizes of the 4G/5G portions for dynamic spectrum sharing 328 can be dynamically allocated based on various factors. In some examples, the NB IoT 324 can be implemented "in-band" in the 5G context (as discussed herein) and in a guard band implementation if an adjacent frequency resource is allocated to 4G. In some examples, spectrum can be allocated based at least in part on one or more of expected, real-time, or near real-time information about network resources, load levels, UE capabilities (e.g., 4G capable, 4G/5G capable, etc.), bandwidth demands, bearer assignments, and the like.

In some examples, spectrum can be allocated based at least in part on network information that can include, but is not limited to: load information (e.g., a number of connections, available bandwidth, delay, queue size, jitter, etc. of 4G or 5G base stations); beamforming information (e.g., indicative of individual beamforming lobe(s) associated with various UEs (e.g., indicative of location information)); profile information (e.g., a user profile based on an International Mobile Equipment Identity (IMEI), for example, received from various UEs, indicative of a subscriber level associated with UEs); attach status (e.g., a history of any successful/unsuccessful connections with the 4G/5G base stations, or others); bearer type (e.g., indicative of a bearer type assigned to the UEs); aggregated information (e.g., network information from a plurality of UEs that have been aggregated or otherwise combined); and the like.

In some examples, spectrum can be allocated based at least in part on one or more of UE location information (e.g., GPS information, a beamforming lobe from a base station, etc.); signal information (e.g., a strength of the signal from a base station to a UE, such as a downlink signal strength such as a received signal strength indication (RSSI), reference signal received power (RSRP), reference signal received quality (RSRQ), signal-to-interference-plus-noise ratio (SINR), etc.); attach status (e.g., a history of any successful/unsuccessful connections with base stations, such as one or more failed addition requests, or others); traffic type (e.g., QCI, application type, voice or data traffic, latency requirements, bandwidth requirements, etc.); bearer type; capability information (e.g., whether a UE (such as the UE 106 or 114 is capable of spectrum sharing, and/or whether the UE is capable of communicating via the 5G protocol, etc.); and the like.

An example 308 illustrates NB IoT implemented "in-band" relative to a 5G frequency resource, as discussed herein. In some cases, the example 308 corresponds to the example 130 illustrated in FIG. 1.

In some examples the spectrum block 120 can correspond to any particular portion of spectrum. For example, the spectrum block 120 may represent a 1 MHz, 5 MHz, 10 MHz, etc. portion of a spectrum for wireless communications. The spectrum component may be associated with any licensed or unlicensed frequency band such as low band (e.g., including but not limited to 600 MHz), mid-band (e.g., including but not limited to 2500 MHz), high band (e.g., including but not limited to millimeter waves approximately 20 GHz and above), and the like. As may be understood, these examples are not limiting and the spectrum block 120 may represent other frequency ranges and values consistent with this disclosure.

Figure 4:
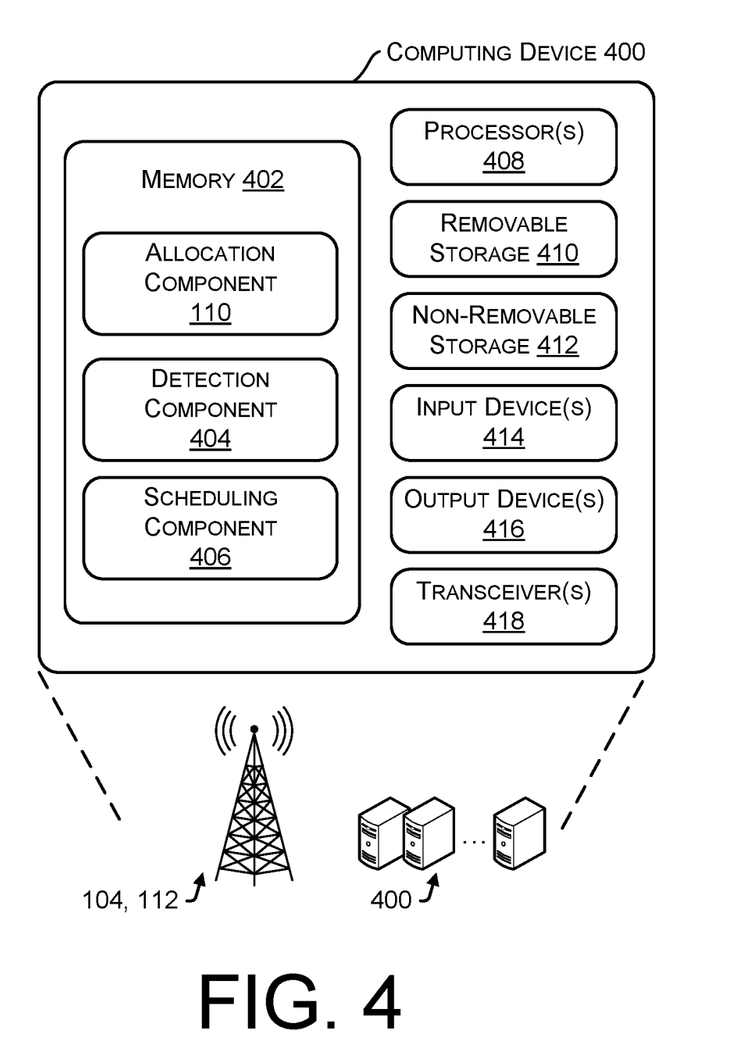
FIG. 4 illustrates an example computing device to implement the deployment techniques, as described herein.

FIG. 4 illustrates an example computing device 400 to implement the deployment techniques, as described herein. In some embodiments, the computing device 400 can correspond to the base stations 104 or 112, a device implementing the allocation components 110 and/or 116 of FIG. 1, and/or other components. It is to be understood in the context of this disclosure that the computing device 400 can be implemented as a single device, as a plurality of devices, or as a system with components and data distributed among them.

As illustrated, the computing device 400 comprises a memory 402 storing the allocation component 110 (and/or the allocation component 116), a detection component 404, and a scheduling component 406 to allocate spectrum in an NB IoT context based on NB IoT devices, network information, UE information, and the like. Also, the computing device 400 includes processor(s) 408, a removable storage 410 and non-removable storage 412, input device(s) 414, output device(s) 416, and transceiver(s) 418.

In various embodiments, the memory 402 is volatile (such as RAM), non-volatile (such as ROM, flash memory, etc.) or some combination of the two. The allocation component 110, the detection component 404, and the scheduling component 406 stored in the memory 402 can comprise methods, threads, processes, applications or any other sort of executable instructions. The allocation component 110, the detection component 404, and the scheduling component 406 can also include files and databases.

In some examples, the allocation component 110 can include functionality to allocate a first portion of spectrum for 4G and/or 5G communications and a second portion of the spectrum for NB IoT communications. For example, the allocation component 110 can allocate a portion of spectrum for a guard band, standalone, or in-band deployment of an NB IoT device. In a cases where the NB IoT device is in a guard band mode, the allocation component can determine where to add a guard band to a portion of spectrum, thereby leaving free space for the NB IoT device.

In transitioning from 4G to 5G (e.g., as illustrated in FIG. 1), the allocation component 110 can receive an indication that one or more NB IoT devices are configured to use a portion of spectrum and can carve out, reserve, or otherwise allocate a portion of spectrum to allow for a NB IoT device previously operating in guard band mode in the 4G context to continue to operate in an in-band mode in the context of 5G. However, as discussed herein, allocating a clear portion for the NB IoT device to remain transmitting and receiving without change simplifies the NB IoT device deployment and minimizes unnecessary control overhead (e.g., 4G and/or 5G control signals), thereby maximizing space in a PRB for NB IoT data or control.

In some examples, the detection component 404 can include functionality to detect transmission of signal(s) from an NB IoT device in a coverage area of a base station. In a case where an NB IoT device is configured in accordance with a portion of a spectrum allocated for the NB IoT device, the detection component 404 can store an indication of the presence of the NB IoT device and can allow communications. In a case where an NB IoT device is not configured in accordance with a portion of a spectrum allocated for the NB IoT device, the detection component 404 can further send data or an instruction to the NB IoT device to transmit and/or receive data in the portion of spectrum allocated for NB IoT communications.

In some cases, the detection component 404 can further include functionality to redeploy one or more NB IoT devices to change between the various standalone, guard band, and in-band deployment modes and/or frequencies of operation.

In some examples, the scheduling component 406 can include functionality to receive or determine scheduling information associated with NB IoT devices transmitting and/or receiving data using particular frequencies and/or at particular times. Over time, the scheduling component 406 can determine scheduling information and usage levels and can dynamically allocate a portion of spectrum otherwise allocated to NB IoT devices to 4G devices and/or 5G devices. Additional aspects of dynamic scheduling are discussed throughout this disclosure.

In some embodiments, the processor(s) 408 is a central processing unit (CPU), a graphics processing unit (GPU), or both CPU and GPU, or other processing unit or component known in the art.

The computing device 400 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media can include volatile and non-volatile, removable and non-removable media implemented in any method or technology for storage of information, such as computer readable instructions, data structures, program modules, or other data. The memory 402, the removable storage 410 and the non-removable storage 412 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 400. Any such tangible computer-readable media can be part of the computing device 400.

The computing device 400 may be configured to communicate over a telecommunications network using any common wireless and/or wired network access technology. Moreover, the computing device 400 may be configured to run any compatible device operating system (OS), including but not limited to, Microsoft Windows Mobile, Google Android, Apple iOS, Linux Mobile, as well as any other common mobile device OS.

The computing device 400 also can include input device(s) 414, such as a keypad, a cursor control, a touch-sensitive display, voice input device, etc., and output device(s) 416 such as a display, speakers, printers, etc. These devices are well known in the art and need not be discussed at length here.

As illustrated in FIG. 4, the computing device 400 also includes one or more wired or wireless transceiver(s) 418. For example, the transceiver(s) 418 can include a network interface card (NIC), a network adapter, a LAN adapter, or a physical, virtual, or logical address to connect to various networks, devices, or components illustrated in the environments 100 and 102, for example. To increase throughput when exchanging wireless data, the transceiver(s) 418 can utilize multiple-input/multiple-output (MIMO) technology. The transceiver(s) 418 can comprise any sort of wireless transceivers capable of engaging in wireless, radio frequency (RF) communication. The transceiver(s) 418 can also include other wireless modems, such as a modem for engaging in Wi-Fi, WiMAX, Bluetooth, infrared communication, and the like.

Figure 5:
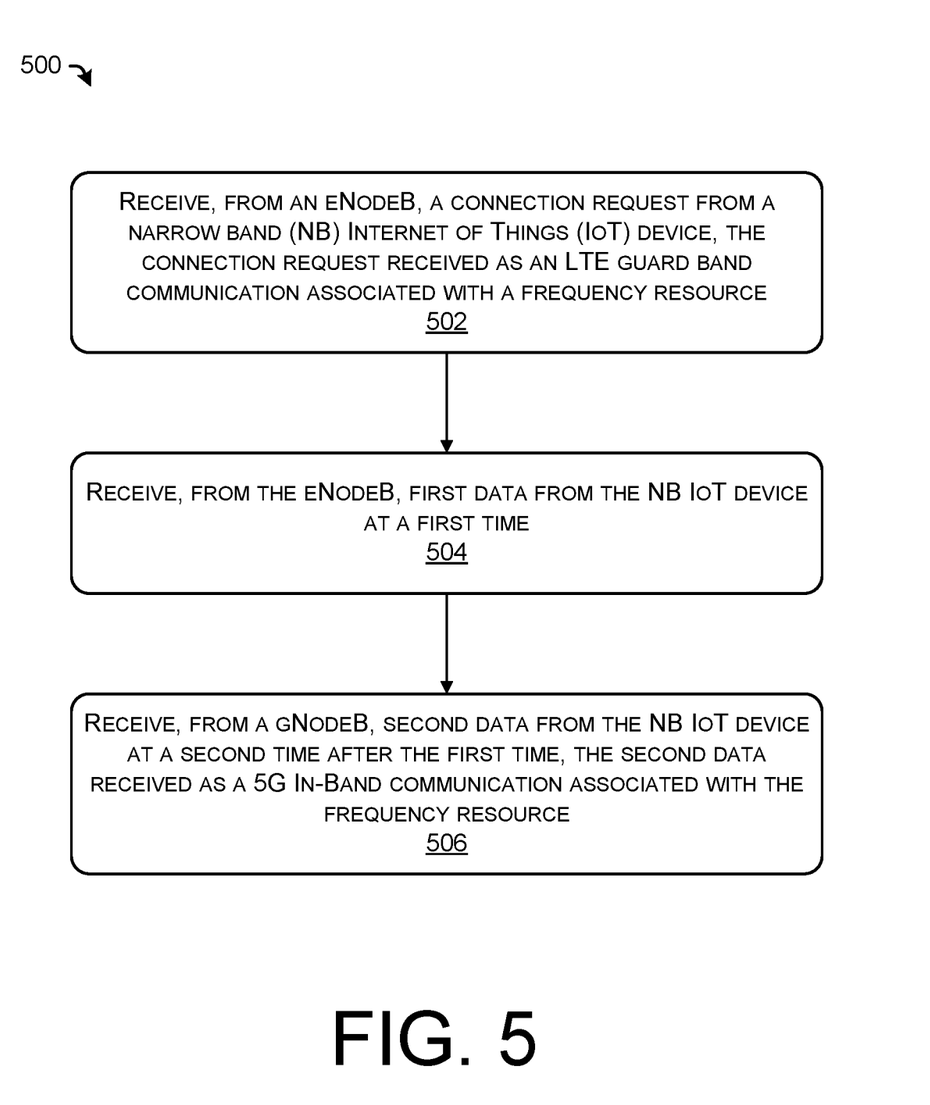
FIG. 5 illustrates an example process for deploying NB-IoT devices, as described herein.

FIG. 5 illustrates an example process in accordance with examples of the disclosure. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement various processes.

FIG. 5 illustrates an example process for deploying NB-IoT devices, as described herein. The example process 500 can be performed by the allocation component 110 (or another component), in connection with other components and/or devices discussed herein. Some or all of the process 500 can be performed by one or more devices or components in the environment 100 or 102, for example.

At operation 502, the process can include receiving, from an eNodeB, a connection request from a narrow band (NB) Internet of Things (IoT) device, the connection request received as an LTE guard band communication associated with a frequency resource. In some examples, the operation 502 can correspond to the example environment 100 in which the NB IoT device 108 sends a communication request to the 4G base station 104. The 4G base station 104 (e.g., an eNodeB) can send an indication of the connection request to the allocation component 110, for example, or another device configured to implement the techniques discussed herein.

At operation 504, the process can include receiving, from the eNodeB, first data from the NB IoT device at a first time. For example, the NB IoT device can transmit any audio, video, or data values to the eNodeB.

In some examples, the operation 504 can include storing an indication of the NB IoT using wireless resources. In some examples, the operation 504 can include sending an indication to a gNodeB (or other base station) to allocate or otherwise reserve a portion of spectrum for the NB IoT communications. In some examples the operation 504 can include configuring a 4G and/or 5G base station to reserve or allocate a portion of spectrum to one or more NB IoT devices.

At operation 506, the process can include receiving, from a gNodeB, second data from the NB IoT device at a second time after the first time, the second data received as a 5G In-Band communication associated with the frequency resource. In some examples, the operation 506 can correspond to the example environment 102 in which the NB IoT device 108 sends data to the 5G base station 112 (e.g., a gNodeB) at the second time after the first time, using the same NB IoT spectrum 124. The 5G base station 112 can send an indication of the data to the allocation component 110 or 116, for example, or another device configured to implement the techniques discussed herein.

Thus, aspects of the disclosure are directed to allocating or otherwise reserving wireless resources for NB IoT devices in 4G and/or 5G contexts to continue to operate without changing a frequency resource for the NB IoT device. This may reduce reprovisioning or redeploying the NB IoT device and signaling associated with such reprovisioning. Additionally, techniques discussed herein may obviate signaling or controls to change an operating frequency of the NB IoT devices. As networks contemplate potentially billions of NB IoT devices, this implementation represents significant improvement in transitioning between wireless protocols and deploying devices in one or more networks.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by an allocation component, the method comprising:
receiving, from an eNodeB, a connection request from a narrowband (NB) Internet of Things (IoT) device, the connection request received as an LTE guard band communication associated with a frequency resource;

receiving, from the eNodeB, first data from the NB IoT device at a first time, the first data received as the LTE guard band communication associated with the frequency resource;

allocating, at a gNodeB and based on the first data, the frequency resource to the NB IoT device to allow the NB IoT device to continue to operate without change in the frequency resource;

receiving, at the gNodeB, second data from the NB IoT device at a second time after the first time, the second data received as a 5G in-band communication associated with the frequency resource; and sending, by the gNodeB, an indication of the second data to the eNodeB.

2. The method of claim 1, wherein:
the frequency resource is a first frequency resource associated with a guard band associated with the eNodeB; and
the gNodeB transmits in a second frequency resource associated with a subset of the guard band.

3. The method of claim 1, further comprising:
storing, based at least in part on the first data, an indication of the frequency resource associated with the NB IoT device.

4. The method of claim 1, wherein the allocating comprises reserving, at the gNodeB, the frequency resource for the NB IoT device.

5. The method of claim 1, wherein a communication associated with the eNodeB is not present at the second time.

6. The method of claim 1, further comprising:
receiving, from the NB IoT device, scheduling data associated with a transmission from the NB IoT device; and
allocating, based at least in part on the scheduling data, the frequency resource to the gNodeB to transmit data to another device at a third time after the second time.

7. The method of claim 1, wherein the NB IoT device is a first NB IoT device and wherein the frequency resource is a first frequency resource, the method further comprising:
receiving, from a second NB IoT device, third data transmitted using a second frequency resource;
sending, to the second NB IoT device, fourth data; and
receiving, from the second NB IoT device and based at least in part on the third data, fifth data transmitted using the first frequency resource.

8. A system comprising:
one or more processors; and
one or more non-transitory computer-readable media storing computer-executable instructions that, when executed, cause the one or more processors to perform operations comprising:
receiving, from an eNodeB, a connection request from a narrowband (NB) Internet of Things (IoT) device, the connection request received as an LTE guard band communication associated with a frequency resource;
receiving, from the eNodeB, first data from the NB IoT device at a first time, the first data received as the LTE guard band communication associated with the frequency resource;
allocating, at a gNodeB and based on the first data, the frequency resource to the NB IoT device to allow the NB IoT device to continue to operate without change in the frequency resource;
receiving, at the gNodeB, second data from the NB IoT device at a second time after the first time, the second data received as a 5G in-band communication associated with the frequency resource; and
sending, by the gNodeB, an indication of the second data to the eNodeB.

9. The system of claim 8, wherein:
the frequency resource is a first frequency resource associated with a guard band associated with the eNodeB; and
the gNodeB transmits in a second frequency resource associated with a subset of the guard band.

10. The system of claim 8, the operations further comprising:
storing, based at least in part on the first data, an indication of the frequency resource associated with the NB IoT device.

11. The system of claim 8, wherein the allocating comprises reserving, at the gNodeB, the frequency resource for the NB IoT device.

12. The system of claim 8, wherein a communication associated with the eNodeB is not present at the second time.

13. The system of claim 8, the operations further comprising:
receiving, from the NB IoT device, scheduling data associated with a transmission from the NB IoT device; and
allocating, based at least in part on the scheduling data, the frequency resource to the gNodeB to transmit data to another device at a third time after the second time.

14. The system of claim 8, wherein the NB IoT device is a first NB IoT device and wherein the frequency resource is a first frequency resource, the operations further comprising:
receiving, from a second NB IoT device, third data transmitted using a second frequency resource;
sending, to the second NB IoT device, fourth data; and
receiving, from the second NB IoT device and based at least in part on the fourth data, fifth data transmitted using the first frequency resource.

15. One or more non-transitory computer-readable media storing instructions executable by a processor, wherein the instructions, when executed, cause the processor to perform operations comprising:
receiving, from an eNodeB, a connection request from a narrowband (NB) Internet of Things (IoT) device, the connection request received as an LTE guard band communication associated with a frequency resource;
receiving, from the eNodeB, first data from the NB IoT device at a first time, the first data received as the LTE guard band communication associated with the frequency resource; allocating, at a gNodeB and based on the first data, the frequency resource to the NB IoT device to allow the NB IoT device to continue to operate without change in the frequency resource;
receiving, at the gNodeB, second data from the NB IoT device at a second time after the first time, the second data received as a 5G in-band communication associated with the frequency resource; and
sending, by the gNodeB, an indication of the second data to the eNodeB.

16. The one or more non-transitory computer-readable media of claim 15, wherein:
the frequency resource is a first frequency resource associated with a guard band associated with the eNodeB; and
the gNodeB transmits in a second frequency resource associated with a subset of the guard band.

17. The one or more non-transitory computer-readable media of claim 15, the operations further comprising:
> storing, based at least in part on the first data, an indication of the frequency resource associated with the NB IoT device.

18. The one or more non-transitory computer-readable media of claim 17, wherein the allocating comprises reserving, at the gNodeB, the frequency resource for the NB IoT device.

19. The one or more non-transitory computer-readable media of claim 15, the operations further comprising:
> receiving, from the NB IoT device, a scheduling data associated with a transmission from the NB IoT device; and
>
> allocating, based at least in part on the scheduling data, the frequency resource to the gNodeB to transmit data to another device at a third time after the second time.

20. The one or more non-transitory computer-readable media of claim 15, wherein the NB IoT device is a first NB IoT device and wherein the frequency resource is a first frequency resource, the operations further comprising:
> receiving, from a second NB IoT device, third data transmitted using a second frequency resource;
>
> sending, to the second NB IoT device, fourth data; and
>
> receiving, from the second NB IoT device and based at least in part on the fourth data, fifth data transmitted using the first frequency resource.

\* \* \* \* \*